United States Patent [19]

Cuevas

[11] Patent Number: 5,257,817
[45] Date of Patent: Nov. 2, 1993

[54] AIR BAG INFLATOR HAVING A BALL PISTON VALVE ASSEMBLY

[75] Inventor: Jess A. Cuevas, Scottsdale, Ariz.
[73] Assignee: TRW Inc., Lyndhurst, Ohio
[21] Appl. No.: 837,075
[22] Filed: Feb. 18, 1992
[51] Int. Cl.⁵ .............................................. B60R 21/26
[52] U.S. Cl. .................................. 280/736; 280/742; 222/3
[58] Field of Search ............... 280/736, 738, 741, 742; 222/3, 5

[56] References Cited

U.S. PATENT DOCUMENTS

| | | |
|---|---|---|
| 3,638,964 | 2/1972 | Chute . |
| 3,877,721 | 4/1975 | Brown, Jr. ............................ 280/736 |
| 3,900,211 | 8/1975 | Russell et al. ................... 280/742 X |
| 4,981,534 | 1/1991 | Scheffe ......................... 280/741 X |
| 5,195,777 | 3/1993 | Cuevas ................... 222/3 X |

*Primary Examiner*—Joseph D. Pape
*Attorney, Agent, or Firm*—Tarolli, Sundheim & Covell

[57] ABSTRACT

An apparatus for inflating a vehicle occupant restraint includes a gas source. A gas outlet opening allows flow of gas from the gas source into the vehicle occupant restraint to inflate the vehicle occupant restraint. A valve assembly for controlling flow of gas through the gas outlet opening includes a ball piston disposed in a cylinder. The ball piston has a surface against which the gas acts to move the ball piston in a first direction in the cylinder to allow increased flow of gas through the gas outlet opening. An elastomeric member controls movement of the ball piston in the cylinder.

14 Claims, 2 Drawing Sheets

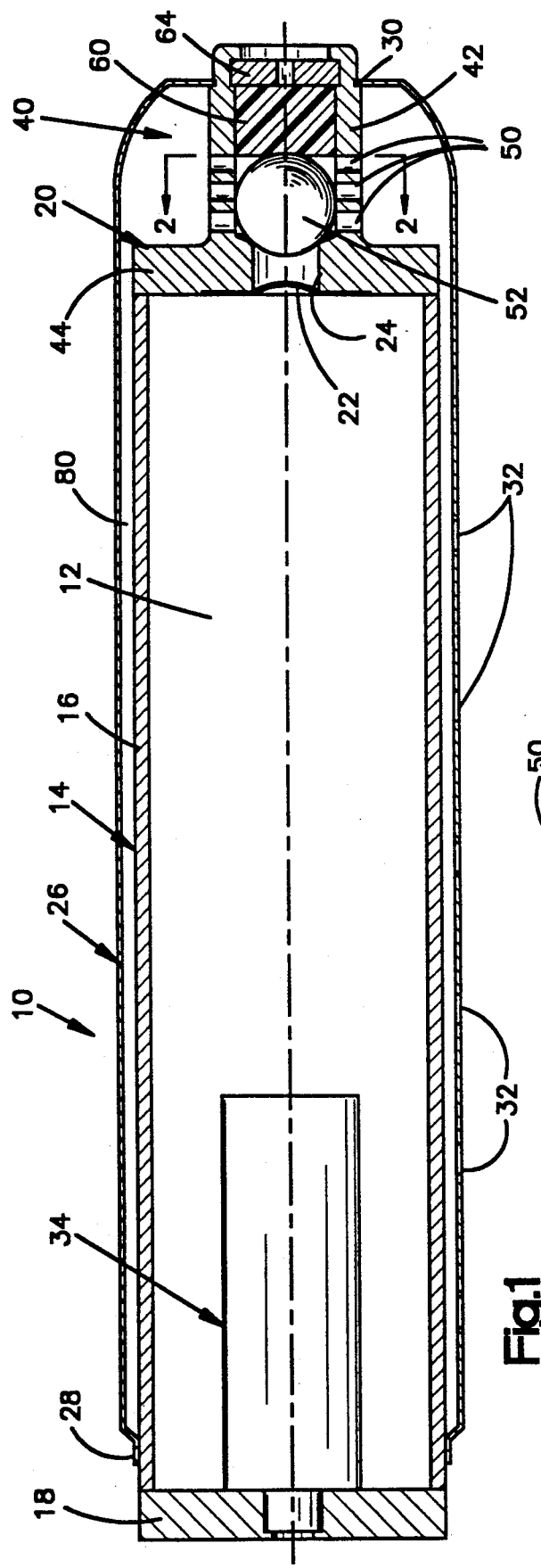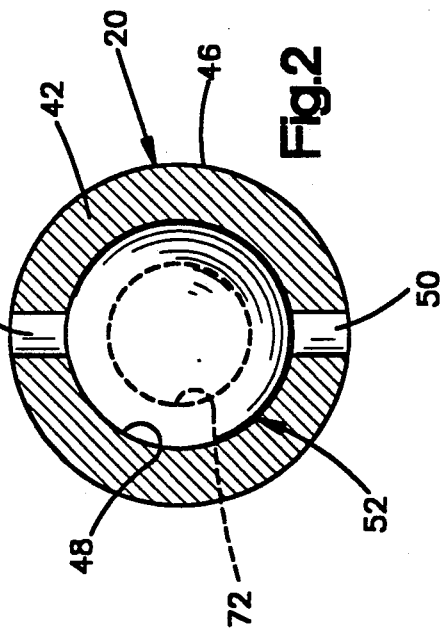

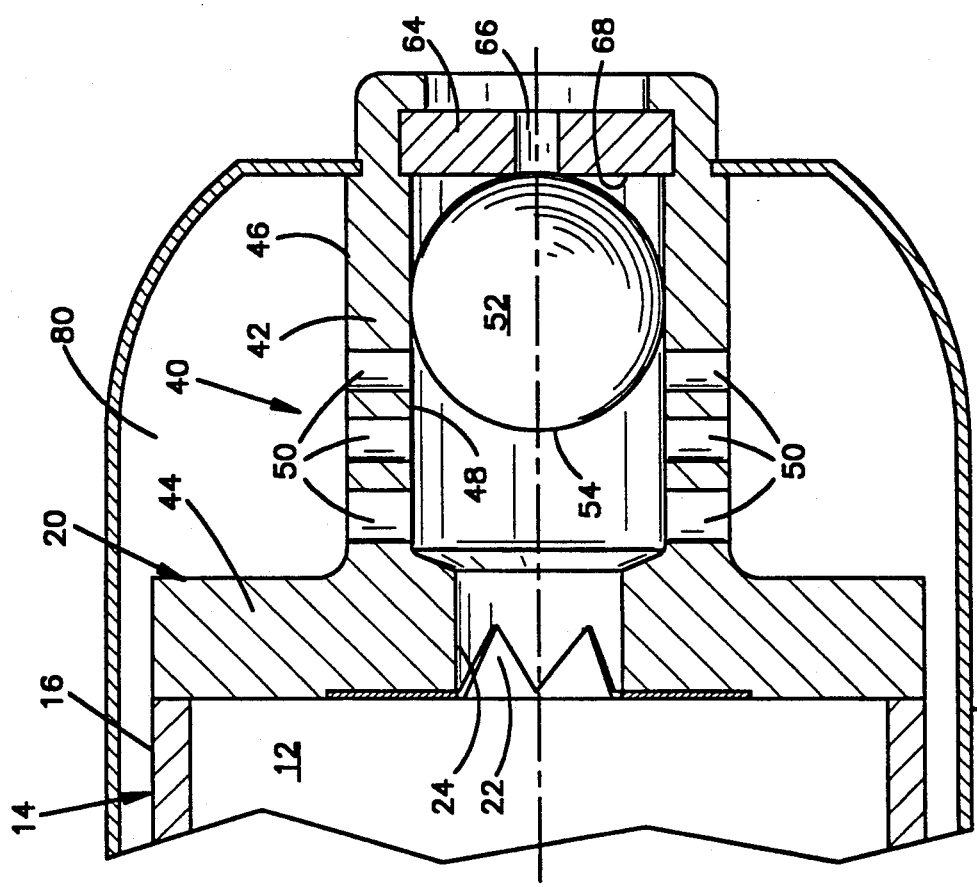
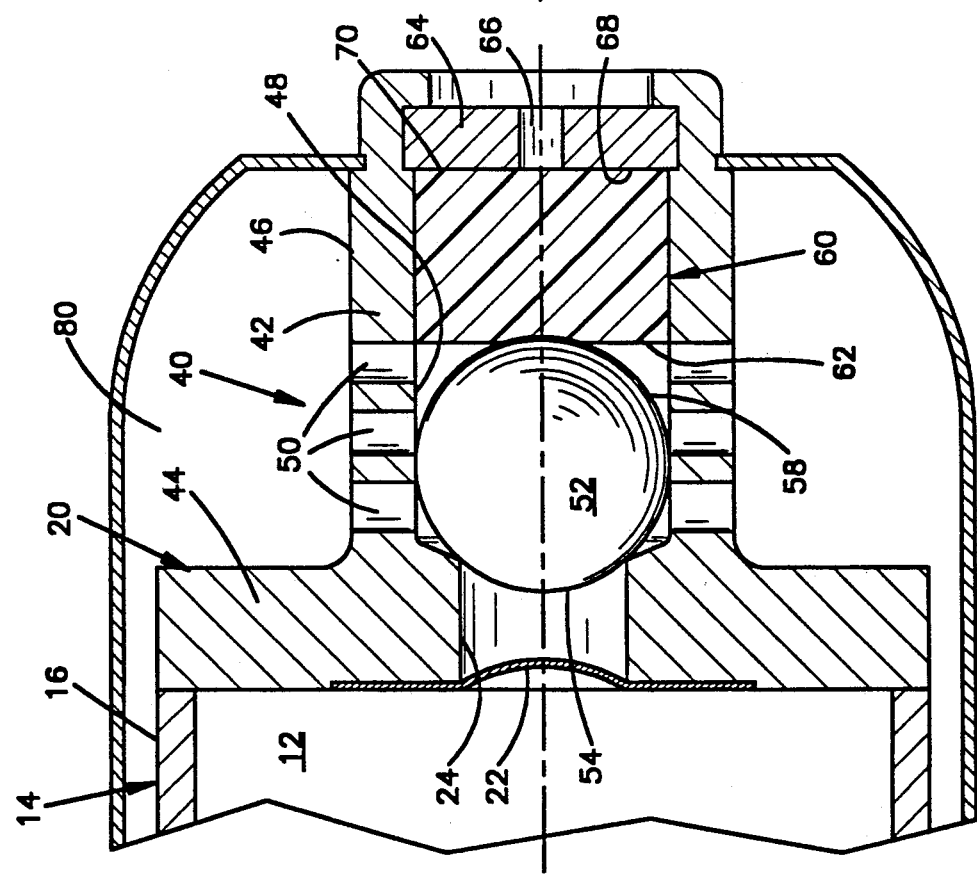

AIR BAG INFLATOR HAVING A BALL PISTON VALVE ASSEMBLY

BACKGROUND OF THE INVENTION

1. Technical Field

The present invention relates to an air bag inflator, and more particularly to apparatus for controlling the rate of gas flow from an air bag inflator.

2. Description of the Prior Art

A known vehicle safety apparatus includes an air bag and an inflator for providing gas to inflate the air bag. A quantity of gas is stored under pressure in the inflator. Upon actuation of the inflator, the gas is released and directed into the air bag to inflate the air bag.

In a vehicle safety apparatus including an air bag, it is desirable to control the pressure in the air bag to ensure that the air bag inflates by the desired amount at the desired time. Controlling the rate of gas flow into the air bag controls bag inflation. A valve assembly is typically used to control the rate of gas flow out of the inflator into the air bag. U.S. Pat. No. 3,638,964 discloses an air bag inflator having a movable member for controlling the release of gas into an air bag. A quantity of silicone oil or grease is forced through an outlet to retard and thereby control movement of the movable member.

SUMMARY OF THE INVENTION

The present invention is an apparatus for inflating a vehicle occupant restraint such as an air bag. The apparatus includes a gas source and means for defining a gas outlet opening in the gas source to allow flow of gas from the gas source into the air bag to inflate the air bag. Valve means for controlling flow of gas through the gas outlet opening includes a ball piston disposed in a cylinder. The ball piston has a surface against which the gas acts to move the ball piston in a first direction in the cylinder to allow increased flow of gas through the gas outlet opening.

In a preferred embodiment, the apparatus includes a member for controlling movement of the ball piston. The member is made of an elastomeric material. The elastomeric member resists and thereby controls movement of the ball piston. As the ball piston moves in the cylinder, the contact area between the ball piston and the elastomeric member increases, and the elastomeric member provides more resistance to the movement of the ball piston. The construction of the elastomeric member is selected to control the rate of movement of the ball piston in a desired manner. This controls the rate of gas flow into the air bag, thus controlling the pressure in the air bag.

BRIEF DESCRIPTION OF THE DRAWINGS

The foregoing and other features of the present invention will become apparent to one skilled in the art upon a consideration of the following description of the invention with reference to the accompanying drawings, wherein:

FIG. 1 is a longitudinal sectional view of an inflator embodying the present invention;

FIG. 2 is a transverse sectional view taken along line 2—2 of FIG. 1;

FIG. 3 is an enlarged view of a portion of FIG. 1 showing a valve assembly in a first condition; and FIG. 4 is a view similar to FIG. 3 showing the valve assembly in a second condition.

DESCRIPTION OF PREFERRED EMBODIMENT

The present invention relates to an air bag inflator and particularly to an inflator for inflating an air bag to protect the passenger of a vehicle. The present invention is applicable to various inflator constructions. As representative of the present invention, FIG. 1 illustrates an inflator 10 for inflating an air bag (not shown) to protect the passenger of a vehicle. The inflator 10 is an augmented inflator having a quantity of gas stored in a container in the inflator, usually under pressure. The inflator includes an initiator and a quantity of combustible material disposed in the container. Upon actuation of the inflator, the initiator ignites the combustible material, which generates heat to raise the pressure of the gas in the container. The combustible material also generates additional gas to augment the gas stored in the container. The stored gas and the gas generated by the combustible material are directed into the air bag to inflate the air bag. It should be understood that the present invention could be embodied in an inflator which uses only combustible material to generate gas, rather than in an augmented inflator.

In the inflator 10, a quantity of gas 12 under pressure is stored in a container 14. The gas 12 is preferably argon, although other gases such as air or nitrogen could be used. The container 14 includes a housing 16 and two end caps 18 and 20. An initiator assembly 34, including an initiator and a combustible gas generating material, is disposed within the gas 12 in the container 14 adjacent the end cap 18. A burst disk 22 seals an opening 24 in the end cap 20.

A cylindrical diffuser tube 26 extends around the container 14. One end of the diffuser tube 26 is secured at 28 to the housing 16 near the end cap 18. The other end of the diffuser tube 26 is secured at 30 to the end cap 20. The diffuser tube 26 has a series of outlets 32 along its length to direct gas from the inflator 10 into the air bag.

The inflator 10 includes a valve assembly 40 for controlling the flow of gas 12 out of the inflator 10. The valve assembly 40 includes a cylinder 42 formed as part of the end cap 20. The cylinder 42 extends axially outward from a radially extending portion 44 of the end cap 20. The cylinder 42 has a cylindrical outer surface 46 (FIG. 3) and a cylindrical inner surface 48 between which extend a series of radial gas outlet openings 50.

A ball piston 52 is disposed in the cylinder 42. The ball piston 52 is spherical in shape and is preferably made of nylon with a durometer of about 20. If the present invention is to be embodied in an inflator which uses only a combustible material for generating gas, the ball piston 52 is preferably made of steel to resist the heat of combustion. The ball piston 52 has a convex spherical surface portion 54 facing axially inward of the inflator 10 toward the burst disk 22 (to the left as viewed in FIG. 3). The ball piston 52 also has a convex spherical surface portion 58 facing axially outward of the inflator 10 (to the right as viewed in FIG. 3).

A cylindrically shaped elastomeric member 60 is disposed in the cylinder 42 axially outward of the ball piston 12. The elastomeric member 60 is preferably made of Shin-Etsu Silicone X-82-2001 A/B which may be purchased from Shin-Etsu Company in Los Angeles, California. The material is purchased in a liquid form, poured into a mold of a desired shape and cured at room temperature to form the elastomeric member 60. When cured, the elastomeric member 60 may have a consistency somewhat like that of a pencil eraser. The material pulverizes upon the application of force in excess of a predetermined amount. Because the elastomeric member 60 is on piece of solid material, it is easily assembled in the inflator 10.

An orifice plate 64 is secured to the end cap 20 and defines the axially outer end of the cylinder 42. An orifice 66 extends axially through the orifice plate 64. A radially extending surface 68 of the orifice plate 64 is in engagement with a radially extending circular end surface 70 of the elastomeric member 60.

FIG. 3 illustrates the parts of the valve assembly 40 in a first condition prior to actuation of the inflator 10. The burst disk 22 is intact, maintaining the gas 12 within the container 14. The ball piston 52 is disposed at the axially inner end of the cylinder 42 between the opening 24 and the gas outlet openings 50. The elastomeric member 60 is disposed between the ball piston 52 and the orifice plate 64. A radially extending planar surface 62 of the elastomeric member 60 is in engagement with the convex spherical surface portion 58 of the ball piston 52.

Upon actuation of the inflator 10 in response to a vehicle condition such as sudden deceleration, the initiator assembly 34 heats the gas 12 in the container 14 to raise its pressure. The initiator assembly 34 also generates additional gas to augment the gas 12. When the gas pressure in the container 14 reaches a predetermined level, the burst disk 22 bursts axially outwardly as shown in FIG. 4. The gas 12 contacts the surface portion 54 of the ball piston 52 and causes the ball piston to move axially in the cylinder 42 from the position shown in FIG. 3 to the position shown in FIG. 4. Because the ball piston 52 is spherical, it does not cock as it moves along the cylinder 42, but rather travels smoothly along the cylindrical inner surface 48 of the cylinder.

The elastomeric member 60 is disposed in the path of movement of the ball piston 52. The force exerted by the moving ball piston 52 on the elastomeric member 60 causes the elastomeric member 60 to pulverize. The pulverized material is extruded or forced out of the cylinder 42 through the orifice 66. A small amount may remain in the cylinder 42 in the form of a dust.

As the ball piston 52 moves in the cylinder 42, it exposes the gas outlet openings 50. The gas 12 flows axially from the container 14 through the opening 24 in the end cap 20. The gas 12 next flows radially outwardly through the gas outlet openings 50 into a space 80 between the housing 14 and the diffuser tube 26. The gas 12 then flows out of the inflator 10 through the outlets 32 in the diffuser tube 26 and into the air bag (not shown) to inflate the air bag.

As the ball piston 52 moves in the cylinder 42 from the position shown in FIG. 3 to the position shown in FIG. 4, it exposes an increasing amount of gas exhaust area through the gas outlet openings 50. Thus, the farther along the ball piston 52 is in its path of movement in the cylinder 42, the faster the gas 12 can flow out of the container 14 and into the air bag. Accordingly, the rate of gas flow is controlled by the position of the ball piston 52 in the cylinder 42.

The movement of the ball piston 52 is controlled by the amount of resistance offered by the elastomeric member 60. Because the ball piston 52 is spherical and the surface 62 of the elastomeric member 60 is planar, the area of contact between the ball piston and the elastomeric member is initially small. This is illustrated schematically in FIG. 2 in which the dashed line 72 defines within it one possible initial contact area between the ball piston 52 and the elastomeric member 60, with the ball piston being slightly indented into the surface of the elastomeric member.

Because the ball piston 52 initially contacts only a small area of the elastomeric member 60, the elastomeric member initially offers little resistance to movement of the ball piston. The force of the gas acting on the ball piston 52 can therefore accelerate the ball piston rapidly. The initial contact area may be designed to be smaller or larger to select the initial amount of resistance offered by the elastomeric member 60.

As the ball piston 52 moves along the cylinder 42, the area of contact between the ball piston 52 and the elastomeric member increases until one-half of the surface of the ball piston is in contact with the elastomeric member. The elastomeric member 60 thus provides more resistance to the movement of the ball piston 52, and the ball piston accelerates less rapidly and may even slow down slightly, controlling the rate of gas flow into the air bag. The surface area of the orifice 66 can also be varied to control the rate of extrusion of the elastomeric member 60 through the orifice. This will also control the rate of movement of the ball piston 52 and the rate of gas flow into the air bag.

From the above description of the invention, those skilled in the art will perceive improvements, changes and modifications in the invention. Such improvements, changes and modifications within the skill of the art are intended to be covered by the appended claims.

I claim:

1. Apparatus for inflating a vehicle occupant restraint, comprising:
   a gas source;
   means for defining a gas outlet opening in said gas source to allow flow of gas from said gas source into the vehicle occupant restraint to inflate the vehicle occupant restraint; and
   valve means for controlling flow of gas through said gas outlet opening,
   said valve means comprising a cylinder, a ball piston disposed in said cylinder and including a member for controlling movement of said ball piston in a first direction and wherein said member provides an increasing resistance to movement of said ball piston in said first direction; and
   said ball piston having a surface against which said gas acts to move said ball piston in said first direction to allow increased flow of gas through said gas outlet opening.
   wherein said ball piston has a convex spherical surface for engaging a relatively planar surface of said member, said convex spherical surface engaging a smaller portion of said surface of said member when said ball piston is in a first position, said convex spherical surface engaging a greater portion of said surface of said member when said ball piston is in a second position.

2. Apparatus as defined in claim 1 wherein said ball piston is made of nylon.

3. Apparatus for inflating a vehicle occupant restraint, comprising:
   a gas source;
   means for defining a gas outlet opening in said gas source to allow flow of gas from said gas source into the vehicle occupant restraint to inflate the vehicle occupant restraint, and
   valve means for controlling flow of gas through said gas outlet opening;

said valve means comprising a cylinder and a ball piston disposed in said cylinder and including a member for controlling movement of said ball piston in a first direction and wherein said member is made of elastomeric material; said ball piston having a surface against which said gas acts to move said ball piston in said first direction to allow increased flow of gas through said gas outlet opening.

4. Apparatus as defined in claim 3 wherein said elastomeric material pulverizes upon an application of force on said elastomeric material in excess of a predetermined amount.

5. Apparatus as defined in claim 3 wherein said valve means includes an orifice through which said elastomeric material is extruded upon movement of said ball piston in said first direction.

6. Apparatus as defined in claim 3 wherein said cylinder includes an axially inner portion having said gas outlet opening therein and an axially outer portion having said elastomeric material disposed therein, said ball piston being disposed in a first position in said axially inner portion prior to actuation of said apparatus, said gas upon actuation of said apparatus acting to move said ball piston from said first position to a second position at least partially in said axially outer portion to said cylinder against a resistance from said elastomeric material as said ball piston moves from said first position to said second position.

7. Apparatus for inflating a vehicle occupant restraint comprising:

a gas source including a container having a burstable portion;

means for defining a gas outlet opening downstream of said burstable portion to allow flow of gas from said gas source into the vehicle occupant restraint to inflate the vehicle occupant restraint; and valve means for controlling the flow of gas through said gas outlet opening;

said valve means comprising a cylinder containing said gas outlet opening and a ball piston disposed in said cylinder, said cylinder being positioned downstream of said burstable portion;

said ball piston having a surface against which said gas contacts after said burstable portion bursts and acts to move said ball piston relative to said cylinder and said gas outlet opening to control flow of gas through said gas outlet opening.

8. An apparatus as defined in claim 7 wherein said ball piston is made of nylon.

9. The apparatus as defined in claim 7 further including a member for controlling movement of said ball piston in a first direction which provides an increasing resistance level as said ball piston moves in said first direction.

10. An apparatus as defined in claim 9 wherein said ball piston has a convex spherical surface for engaging a relatively planar surface of said member, said convex spherical surface engaging a smaller portion of said surface of said member when said ball piston is in a first portion, said convex spherical surface engaging a greater portion of said surface of said member when said ball piston is in a second position.

11. The apparatus as defined in claim 9 wherein said member is made of an elastomeric material.

12. The apparatus as defined in claim 11 wherein said elastomeric material pulverizes upon an application of force on said elastomeric material in excess of a predetermined amount.

13. The apparatus as defined in claim 11 wherein said valve means includes an orifice through which said elastomeric material is extruded upon movement of said ball piston in said first direction.

14. The apparatus as defined in claim 11 wherein said cylinder includes an axially inner portion having said gas outlet opening therein and an axially outer portion having said elastomeric material disposed therein, said ball piston being disposed in a first position in said axially inner portion prior to actuation of said apparatus, said gas upon actuation of said apparatus acting to move said ball piston from said first position to a second position at least partially in said axially outer portion of said cylinder against a resistance from said elastomeric material.

* * * * *

UNITED STATES PATENT AND TRADEMARK OFFICE
CERTIFICATE OF CORRECTION

PATENT NO. : 5,257,817
DATED : November 2, 1993
INVENTOR(S) : Jess A. Cuevas

It is certified that error appears in the above-indentified patent and that said Letters Patent is hereby corrected as shown below:

Column 5, line 26, change "to" to --of--.

Signed and Sealed this

Third Day of May, 1994

Attest:

BRUCE LEHMAN

Attesting Officer

Commissioner of Patents and Trademarks